June 3, 1930.    F. L. MAYTAG, JR    1,760,911
SIGNALING DEVICE FOR KINETOGRAPHS OR THE LIKE
Filed Aug. 5, 1929

Inventor.
Frederick L. Maytag Jr,
By Wallace R. Lane
Atty.

Patented June 3, 1930

1,760,911

UNITED STATES PATENT OFFICE

FREDERICK L. MAYTAG, JR., OF NEWTON, IOWA

SIGNALING DEVICE FOR KINETOGRAPHS OR THE LIKE

Application filed August 5, 1929. Serial No. 383,667.

The invention relates to signaling devices and more in particular to signaling devices for kinetographs or the like.

Among the objects of the invention is to provide a novel device for producing audible signals to indicate to an operator of a kinetograph the number of exposures being made of any one object.

Another object of the invention is to provide a novel audible sound producing device which may readily and easily be attached to a kinetograph and operated or actuated by the operating mechanism of the kinetograph to indicate to the operator the number of exposures being made of any one object.

A further object of the invention is to provide a novel audible signaling device for kinetographs which will produce audible signals at regular intervals while the film is being passed over the lens of the kinetograph and which will indicate to the operator the number of exposures being made of any one object, whereby the operator may take approximately the same number of exposures of successive objects.

The invention comprehends the idea of providing a novel audible sound producing device for indicating the number of exposures being taken and which may easily be attached to the filter holder of a kinetograph. In the embodiment selected to illustrate the invention the novel device is constructed and arranged upon a plate which is retained in position in the kinetograph by means of bolts which hold the filter plate to a partition wall in the kinetograph. The sound producing means of the novel device is in the form of an annular ratchet wheel which may be slipped over the filter holder.

The invention further comprehends the provision of a novel signaling device in a kinetograph which may or may not be provided with a filter holder. If the kinetograph is not provided with a filter plate, the invention comprehends the means for retaining the signaling device in an operative position.

Another object of the invention is to provide a novel means for indicating the number of exposures being taken by an operator with a kinetograph, such indicating means being operated or actuated by the operating mechanism of the kinetograph. In the embodiment selected to illustrate the invention means are provided for actuating the indicating means which are in turn actuated or operated by the film advancing sprocket in the kinetograph.

The invention still further comprehends the provision of means for disengaging the actuating mechanism for the sound producing device from the operating mechanism of the kinetograph so that it will not hinder the easy placing of a film in the kinetograph. In the embodiment selected to illustrate the invention such means is shown as connected to the lever arm which is actuated by the film advancing sprocket. When it is desired to thread a film onto the sprocket, the shuttles are pulled away therefrom, one of which bears against a lug projecting from the arm to move it a sufficient distance away from its normal operative position so that a film may be easily threaded upon the sprocket.

It is a further object of the invention to provide a novel sound producing device for kinetographs which will be free from vibrations; it being very important that vibrations be eliminated so that the pictures being taken will not be blurred.

The invention further comprehends the idea of providing a novel mechanism for producing audible signals in which the mechanism will operate quietly whereby the sound produced by such a device will be more pronounced and easily heard by the operator of the kinetograph to which it is attached.

Other objects, advantages, and capabilities are comprehended as will later appear and are inherently possessed by the invention.

Referring to the drawings:

Fig. 2 is a top plan view of the embodiment selected to illustrate the invention and showing the device as connected and operated by the film advancing sprocket of a kinetograph.

Fig. 3 is a vertical cross-sectional view taken in the planes 3—3 of Fig. 2 of the drawings.

Figure 1:
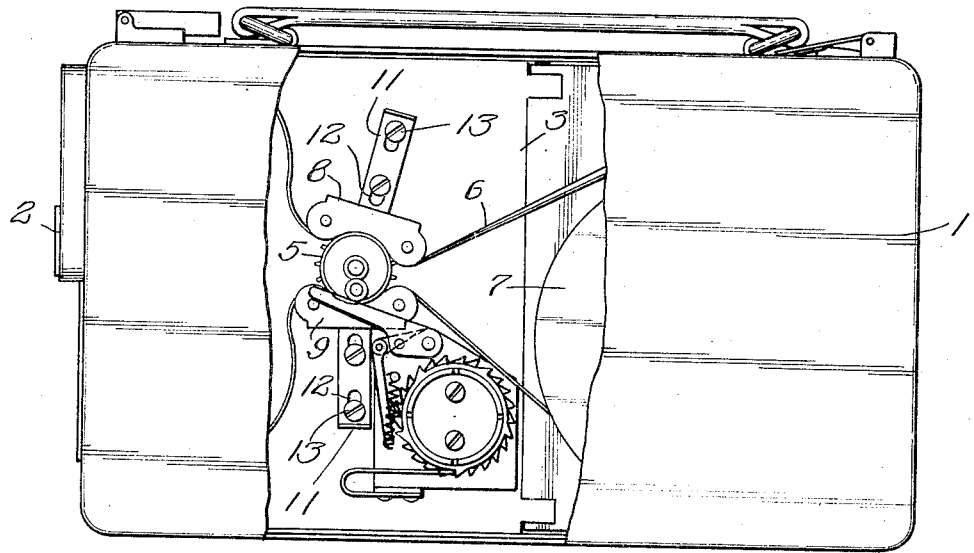
Fig. 1 is a side elevation of a kinetograph with parts broken away showing the novel device for producing audible signals attached to the interior partition thereof and operated by the operating mechanism of the kinetograph.
Figure 1:
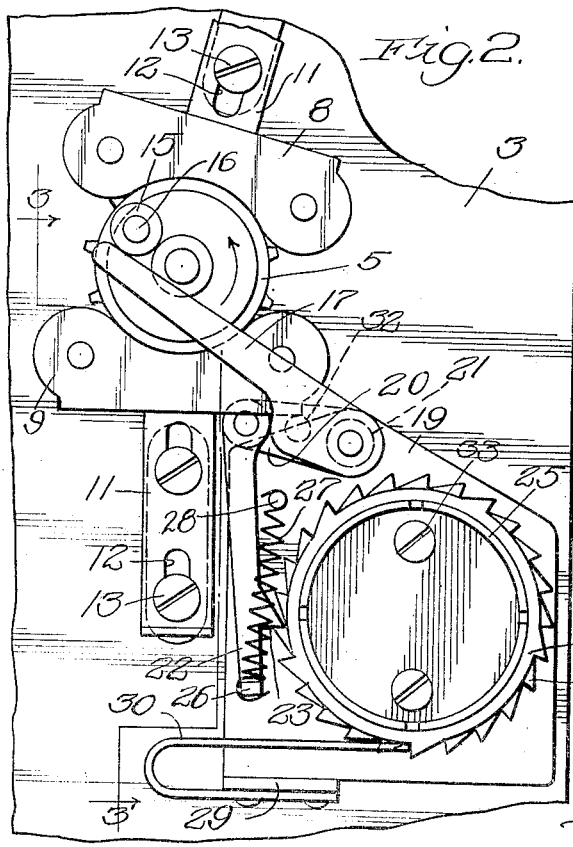
Figure 1:
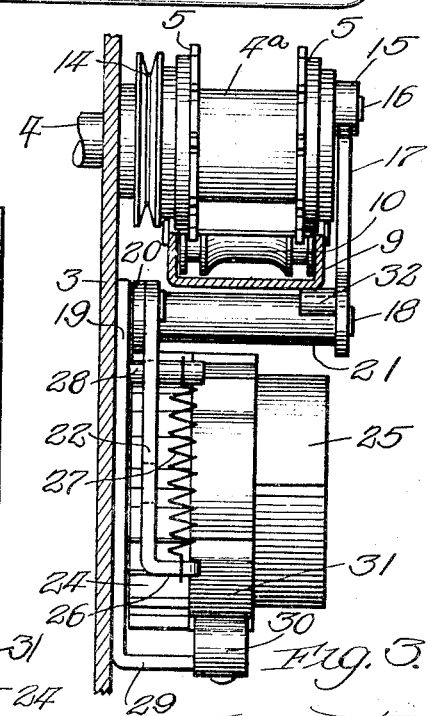

Referring now more in particular to the drawings, the embodiment selected to illustrate the invention is shown as connected to a kinetograph 1 of a box-like construction having a lens 2 at one end thereof and an interior partition 3 having an aperture through which extends a shaft 4 upon which is mounted a hub member 4ª having sprockets 5 mounted thereon and spaced apart a sufficient distance to engage the spaced holes or apertures on the margins of a film 6. The film 6 is unwound from a reel and passes over guiding mechanism to the rear of the lens 2 and is wound upon the reel 7 at one end of the kinetograph 1.

The film 6 is held in engagement with the sprockets 5 by shuttles 8 and 9 having rollers such as 10 mounted therein at both ends over which the film may pass and be guided. The shuttles 8 and 9 are provided with an arm 11 having slotted openings 12 therein which are slidable on the screw or bolts 13 to move the film into or out of engagement with the sprockets 5 which are rotated by a spring motor or the like operatively connected to the shaft 4. A pulley 14 is mounted upon the hub 4ª over which passes a belt (not shown) which passes around a similar pulley (not shown) on the reel 7 and for the driving thereof. The upper sprocket 5 is provided with an annular roller or cam 15 which is eccentrically mounted thereon adjacent to the periphery by the pin 16 and is adapted to bear against a lever arm 17 as the sprocket is rotated. The lever 17 is connected by any suitable means to the upper end of a pin 18, the other end of which is rotatably journalled in a plate 19.

A lever arm 20 is connected to the pin 18 adjacent to the plate 19 and is separated from the lever arm 17 by a hollow hub member 21 surrounding the pin 18. An arm 22 is pivotally connected to the end of the lever arm 20 and carries adjacent to its other end a pawl 23 adapted to engage the teeth on the annular ratchet wheel 24 which may be slipped over a filter-holder 25. The arm 22 is provided with a projecting portion 26 to which is connected a spring 27, the other end of which is connected to a pin 28 in the plate 19 for holding and pressing the pawl 23 against the ratchet wheel 24, as likewise to press the lever arm 17 against the cam or roller 15.

The plate 19 is provided with a turned up edge 29 to which is connected a flat spring 30 adapted to engage the teeth of an annular ratchet wheel 31 which is slipped over the filter holder 25 and adjacent to the ratchet wheel 24. This ratchet wheel however being provided with a less number of teeth than the ratchet 24.

The lever arm 17 is provided with a lug or stub pin 32 adapted to bear against the shuttle 9. Whenever it is desired to thread a film onto the sprockets 5, the shuttle 9 is moved away from these sprockets at which time it bears against this pin to move the lever arm away from the cam or roller 15 so as to provide sufficient clearance between the sprockets 5 and lever arm to enable the operator to conveniently thread the film onto the sprocket.

The filter-holder 25 is held in place upon the partition 3 by the screws or bolts 33 which likewise hold the plate 19 in its proper position. If it be desired to use the present novel device in a kinetograph which is not provided with a filter holder, a suitable cylindrical shaped member similar to the filter holder may be used for holding the ratchet wheels in operative position.

Other means will readily suggest themselves to those who are skilled in the art of photography and may be used if desired.

As the sprockets 5 are rotated by the operating mechanism of the kinetograph to rotate the film 6 and to cause the same to pass over the rear of the lens 2 for taking exposures of objects, the cam or roller rotates to produce a reciprocal movement in the arm 17 and likewise arms 20 and 22. Each revolution of the sprockets 5 causes the pawl 23 to engage a tooth on the ratchet wheel 24 and to cause the same to rotate as likewise to cause rotation of the ratchet wheel 31. The ratchet wheel 31 however, is provided with a less number of teeth than the ratchet wheel 24 so that a number of revolutions of the sprockets 5 is necessary before a tooth on the ratchet wheel 31 causes the spring 30 to drop over the edge thereof and to produce an audible signal or clicking sound. The ratio of the teeth on the sprocket wheels 24 and 31 in the embodiment selected to illustrate the invention is 5 to 1; that is five revolutions of the sprocket 5 causes the end of the spring 30 to drop over a tooth on the ratchet wheel 31. As it is a very easy matter to determine the length of film which will pass over the lens in five revolutions as likewise the number of exposures that are taken during the time necessary for the sprockets to rotate that number of times, it will readily be seen that the audible signal produced by the passing of the end of the spring 30 over a tooth is a very accurate way in which to determine the length of film and likewise the number of exposures taken of any one object.

The number of teeth on the ratchet 31 may be increased or decreased to give an audible signal as frequently as desired. Knowing the ratio of the teeth on the ratchet wheels 24 and 31 respectively, the length of film and likewise the number of exposures being taken between two successive signals may readily be determined.

With this audible signaling device installed in a kinetograph it is possible to take approximately an equal number of exposures of successive objects which are being photographed, in order that when projected upon the screen the objects which have been photographed will appear upon the screen for an approximately equal length of time, the effect of which is to produce a well balanced series of pictures.

While I have herein described and upon the drawings shown an embodiment of the invention, it is to be understood that the invention is not limited to the particular construction, details and arrangements of parts described and shown, but that it comprehends other constructions, details and arrangements of parts without departing from the spirit thereof.

Having thus described my invention, I claim:

1. A signaling device for kinetographs comprising ratchet means for audibly indicating the length of film being used in said kinetograph.

2. A signaling device for kinetographs comprising ratchet operated means for audibly indicating the number of exposures being taken by said kinetograph.

3. A signaling device adapted to be used with kinetographs, comprising means for producing an audible signal, and means for actuating said signaling means.

4. A signaling device adapted to be used with kinetographs, comprising means for audibly indicating the length of film passing over the lens in said kinetograph, and means for actuating said audible indicating means.

5. A signaling device for kinetographs provided with a filter-holder, comprising ratchet means associated with said filter-holder for audibly indicating the length of film passing over the lens of said kinetograph.

6. A signaling device for kinetographs provided with a filter-holder comprising ratchet operated signaling means associated with said filter-holder for indicating the number of exposures being taken of any object by said kinetograph.

7. A signaling device adapted to be used with kinetographs, comprising an audible sound producing means, and means actuated by the kinetograph operating mechanism for operating said sound producing means.

8. A signaling device for kinetographs provided with a film advancing sprocket, comprising an audible sound producing means, and means actuated by said sprocket for operating said sound producing means.

9. A signaling device for kinetographs, having film advancing mechanism, comprising means actuated by said mechanism for audibly indicating the number of exposures being taken of any object.

10. A signaling device for kinetographs provided with a filter-holder and operating mechanism therefor, comprising means associated with said filter-holder and actuated by said operating mechanism for producing audible signals to indicate the number of exposures being taken of any object.

11. A signaling device for kinetographs provided with a filter-holder and operating mechanism therefor, comprising ratchet means associated with said filter-holder and actuated by said operating mechanism for producing audible signals to indicate the number of exposures being taken of any object.

12. A signaling device for kinetographs provided with a filter holder and operating mechanism therefor, comprising ratchet operated signaling means associated with said filter holder and actuated by said operating mechanism for indicating the number of exposures being taken of any object.

13. A signaling device for kinetographs provided with a filter holder and film advancing sprocket, comprising an audible sound producing means associated with said filter holder and actuated by said sprocket for indicating the number of exposures being taken of any object.

14. A signaling device for kinetographs provided with a filter holder and film advancing sprocket, comprising ratchet means associated with said filter holder and actuated by said sprocket for audibly indicating the number of exposures being taken of any object.

15. A signaling device for kinetographs provided with a filter holder and film advancing sprocket, comprising ratchet operated signaling means associated with said filter holder and actuated by said sprocket for indicating the number of exposures being taken of any object.

16. A signaling device for kinetographs having a film advancing sprocket and shuttle, comprising an audible sound producing means, means actuated by said sprocket and adapted to operate said sound producing means to indicate the number of exposures being taken of an object, and means associated with said last mentioned means and adapted to throw said means out of its normal operative position when said shuttle is disengaged from said sprocket to enable an operator to thread a film onto the sprocket.

17. A signaling device for kinetographs having a film advancing sprocket and shuttle and a filter holder therefor, comprising a ratchet mounted on said filter holder, a cam eccentrically mounted on said sprocket, a lever arm adapted to bear against said cam, a pawl operated by said arm and adapted to actuate said ratchet, and means associated with said ratchet and operated thereby for audibly indicating the length of film being used for photographing an object whereby the number of exposures of two or more successive objects may be equal.

18. A signaling device for kinetographs having a film advancing sprocket and shuttle and a filter holder therefor, comprising a ratchet mounted on said filter holder, a cam eccentrically mounted on said sprocket, a lever arm adapted to bear against said cam, a pawl operated by said arm and adapted to actuate said ratchet, and means connected with said ratchet and operated thereby for audibly indicating the length of film being used for photographing an object whereby the number of exposures of two or more successive objects may be equal.

19. A signaling device for kinetographs having a film advancing sprocket and shuttle and a filter holder therefor, comprising a ratchet mounted on said filter holder, a cam eccentrically mounted on said sprocket, a lever arm adapted to bear against said cam, a pawl operated by said arm and adapted to actuate said ratchet, and means associated with said ratchet and operated thereby for audibly indicating the length of film being used for photographing an object whereby the number of exposures of two or more successive objects may be equal, and means connected to said lever arm and bearing against said shuttle for moving said arm out of its normal operative position to enable an operator to thread a film onto the sprocket.

In witness whereof, I hereunto subscribe my name to this specification.

FREDERICK L. MAYTAG, Jr.